US009596836B2

(12) United States Patent
Carstensen et al.

(10) Patent No.: US 9,596,836 B2
(45) Date of Patent: Mar. 21, 2017

(54) APPARATUS AND METHODS FOR THE GUIDANCE OF FISH

(71) Applicant: Smith-Root, Inc., Vancouver, WA (US)

(72) Inventors: Lee Roy Carstensen, Vancouver, WA (US); John Parkin, Vancouver, WA (US)

(73) Assignee: SMITH ROOT, INC., Vancouver, WA (US)

( * ) Notice: Subject to any disclaimer, the term of this patent is extended or adjusted under 35 U.S.C. 154(b) by 0 days.

(21) Appl. No.: 13/941,434

(22) Filed: Jul. 12, 2013

(65) Prior Publication Data

US 2015/0201590 A1 Jul. 23, 2015

(51) Int. Cl.
*A01K 79/02* (2006.01)

(52) U.S. Cl.
CPC .................. *A01K 79/02* (2013.01)

(58) Field of Classification Search
CPC ......... E02B 1/006; A01K 79/02; A01M 29/24
USPC .................. 119/220, 219; 43/17.1
See application file for complete search history.

(56) References Cited

U.S. PATENT DOCUMENTS

| 357,019 | A | | 2/1887 | Merrell et al. |
| 1,292,246 | A | | 1/1919 | Burkey |
| 1,515,547 | A | | 11/1924 | Burkey |
| 1,974,444 | A | | 9/1934 | Burkey |
| 2,426,037 | A | * | 8/1947 | Bichsel et al. ............... 307/107 |
| 2,605,742 | A | * | 8/1952 | Burkey .......................... 119/220 |
| 2,778,140 | A | | 3/1953 | Applegate et al. |
| 2,709,984 | A | * | 6/1955 | Marks ........................... 119/220 |
| 2,764,832 | A | | 8/1955 | Kreutzer |
| 2,808,674 | A | | 10/1957 | Vang |
| 2,832,168 | A | | 4/1958 | Brown |
| 2,836,735 | A | | 5/1958 | Kreutzer |
| 3,011,316 | A | | 12/1958 | Wilson |
| 2,991,421 | A | * | 7/1961 | Volz ....................... A01K 79/02 119/220 |
| 3,110,978 | A | | 11/1963 | Kreutzer |
| 3,484,665 | A | | 4/1967 | Mountjoy |
| 3,487,645 | A | | 8/1968 | Frankel |
| 3,415,001 | A | | 12/1968 | Ott et al. |
| 3,491,474 | A | | 1/1970 | Metcalf, Jr. |
| 3,668,801 | A | | 6/1972 | Metcalf, Jr. |

(Continued)

FOREIGN PATENT DOCUMENTS

DE 2321646 A 11/1974
GB 2201772 A 9/1988

(Continued)

OTHER PUBLICATIONS

Yamamgishi, JP09296526, english translation.*

(Continued)

*Primary Examiner* — Peter M Poon
*Assistant Examiner* — Magdalena Topolski
(74) *Attorney, Agent, or Firm* — J. Curtis Edmondson; Law Offices of J. Curtis Edmondson (57) ABSTRACT

An aquatic electrical barrier that has the electrodes configured in a matrix array configuration, where each electrode element of the matrix array is mounted either directly on the bottom of a water channel or on extendable rods; the matrix array is controlled so that aquatic species may be physically moved by the aquatic species physiological response to a time-varying and spatially-varying electrical field.

13 Claims, 7 Drawing Sheets

(56) References Cited

U.S. PATENT DOCUMENTS

| | | |
|---|---|---|
| 3,683,280 A | 8/1972 | Holt |
| 3,693,276 A | 9/1972 | Kurc |
| 3,797,459 A | 3/1974 | Harris |
| 3,865,663 A | 2/1975 | Oka |
| 4,029,049 A | 6/1977 | Hillier |
| 4,197,423 A | 4/1980 | Fusen |
| 4,211,980 A | 7/1980 | Stowell |
| 4,417,301 A | 11/1983 | Newman |
| 4,481,904 A | 11/1984 | Fletcher |
| 4,509,285 A | 4/1985 | Smith |
| 4,580,525 A | 4/1986 | Marzluf |
| 4,593,648 A | 6/1986 | Marzluf |
| 4,672,967 A | 6/1987 | Smith |
| 4,688,024 A | 8/1987 | Gadde |
| 4,713,315 A | 12/1987 | Smith |
| 4,723,511 A | 2/1988 | Solman et al. |
| 4,750,451 A | 6/1988 | Smith |
| 4,825,810 A | 5/1989 | Sharber |
| 4,862,427 A | 8/1989 | Almagor et al. |
| 4,888,703 A | 12/1989 | Baba et al. |
| 4,949,317 A | 8/1990 | McQuitty et al. |
| 4,955,005 A * | 9/1990 | Loeffelman ............ A01M 29/16  116/22 A |
| 4,963,035 A | 10/1990 | McCarthy et al. |
| 4,982,384 A | 1/1991 | Pipkin et al. |
| 5,111,379 A | 5/1992 | Sharber et al. |
| 5,123,195 A | 6/1992 | Hawkins |
| 5,168,473 A | 12/1992 | Parra |
| 5,214,873 A | 6/1993 | Sharber |
| 5,233,782 A | 8/1993 | Sharber et al. |
| 5,253,610 A | 10/1993 | Sharber |
| 5,266,245 A | 11/1993 | Wellings |
| 5,270,912 A | 12/1993 | Sharber et al. |
| 5,305,711 A | 4/1994 | Sharber |
| 5,311,694 A | 5/1994 | Sharber et al. |
| 5,327,668 A | 7/1994 | Sharber et al. |
| 5,327,854 A | 7/1994 | Smith et al. |
| 5,341,764 A | 8/1994 | Sharber |
| 5,343,442 A | 8/1994 | Vielberth |
| 5,445,111 A | 8/1995 | Smith |
| D362,166 S | 9/1995 | Wall |
| 5,448,968 A * | 9/1995 | Ostlie ............ A01K 79/02  119/220 |
| 5,460,123 A | 10/1995 | Kolz |
| 5,511,335 A | 4/1996 | Langer |
| 5,551,377 A | 9/1996 | Sharber |
| 5,566,643 A | 10/1996 | Charter et al. |
| 5,644,863 A | 7/1997 | Verburg |
| 5,653,052 A * | 8/1997 | .O slashed.stlie ............ 43/17.1 |
| 5,657,964 A | 8/1997 | Yoshida |
| 5,732,931 A | 3/1998 | Massel |
| 5,778,591 A | 7/1998 | Oschman et al. |
| 5,782,033 A | 7/1998 | Park et al. |
| 5,795,099 A | 8/1998 | Parker |
| 5,816,196 A | 10/1998 | Webster et al. |
| 5,879,105 A | 3/1999 | Bishop et al. |
| D422,672 S | 4/2000 | Rich |
| 6,132,303 A | 10/2000 | Buckhaven |
| 6,134,824 A | 10/2000 | Gleeson |
| 6,325,020 B1 | 12/2001 | Guigne |
| 6,357,390 B1 | 3/2002 | Maehata et al. |
| 6,415,742 B1 | 7/2002 | Lee et al. |
| 6,471,576 B1 | 10/2002 | Ross |
| 6,530,337 B1 | 3/2003 | Hoffman |
| 6,765,487 B1 | 7/2004 | Holmes et al. |
| 6,837,182 B2 | 1/2005 | Leblanc |
| 6,917,294 B2 | 7/2005 | Larsen |
| 6,978,734 B1 | 12/2005 | Smith et al. |
| 7,037,183 B1 | 5/2006 | Troyer |
| 7,174,668 B2 | 2/2007 | Locklear |
| 7,264,225 B1 | 9/2007 | Griswold |
| 7,333,395 B2 | 2/2008 | Lewis et al. |
| 7,476,056 B2 | 1/2009 | Dreyer |
| 7,507,132 B2 | 3/2009 | Grune et al. |
| 7,524,140 B2 | 4/2009 | Bishop |
| 7,572,083 B1 | 8/2009 | Bishop et al. |
| 7,686,539 B2 | 3/2010 | Aristaghes et al. |
| D622,806 S | 8/2010 | Hamilton et al. |
| 7,905,440 B2 | 3/2011 | Ikuta et al. |
| 7,975,425 B1 | 7/2011 | Vanburch et al. |
| 8,087,384 B2 | 1/2012 | Smith |
| 8,387,746 B2 | 3/2013 | Parkin |
| 8,951,544 B2 * | 2/2015 | Stroud ............ 424/405 |
| 8,988,226 B2 * | 3/2015 | Vinano et al. ............ 340/573.1 |
| 2003/0051674 A1 | 3/2003 | Leblanc |
| 2006/0018833 A1 | 1/2006 | Murphy et al. |
| 2006/0054498 A1 * | 3/2006 | Inagaki ............ B63B 59/045  204/196.01 |
| 2006/0096547 A1 | 5/2006 | Massey et al. |
| 2007/0220798 A1 | 9/2007 | Davidson |
| 2008/0295758 A1 | 12/2008 | Glessner et al. |
| 2009/0025270 A1 | 1/2009 | Orchard |
| 2009/0035220 A1 | 2/2009 | Jones |
| 2010/0107986 A1 | 5/2010 | Holliman et al. |
| 2010/0212927 A1 * | 8/2010 | Harrick ............ 174/110 R |
| 2010/0224134 A1 | 9/2010 | Burger et al. |
| 2010/0242851 A1 | 9/2010 | Carstensen et al. |
| 2010/0258772 A1 | 10/2010 | Parkin |
| 2010/0288203 A1 | 11/2010 | Smith |
| 2010/0313820 A1 | 12/2010 | Holliman |
| 2011/0023792 A1 * | 2/2011 | Osypka ............ A01M 29/24  119/721 |
| 2011/0031062 A1 | 2/2011 | Elmer |
| 2011/0174231 A1 * | 7/2011 | Edmondson ............ A01K 79/02  119/220 |
| 2011/0277693 A1 * | 11/2011 | Parkin ............ A01K 79/02  119/220 |
| 2011/0283592 A1 | 11/2011 | Smith et al. |
| 2011/0290190 A1 * | 12/2011 | Becker ............ 119/220 |
| 2011/0299938 A1 | 12/2011 | Jung et al. |
| 2012/0031343 A1 * | 2/2012 | DeLuze ............ 119/220 |
| 2013/0008385 A1 | 1/2013 | Smith |
| 2013/0036653 A1 | 2/2013 | Holliman |
| 2013/0073239 A1 | 3/2013 | Edmondson |
| 2014/0238307 A1 * | 8/2014 | Weibel et al. ............ 119/220 |
| 2014/0254060 A1 * | 9/2014 | Malone ............ 361/232 |

FOREIGN PATENT DOCUMENTS

| | | |
|---|---|---|
| JP | 07-300833 | * 11/1995 |
| JP | 09296526 A | * 11/1997 |

OTHER PUBLICATIONS

JP 07-300833, Tadahiko, English Translation.*
Smith-Root, Inc. Fish 90 High Power Fish Stunner.
Smith-Root, Inc. Introduction to Electrofishing and Safety Principles.
Keith W. Forrest et al., North American Journal of Fisheries Management, 29; 885-894, 2009.
Mathew G. Mesa, A Draft Study Plan submitted to US Geological Survey on Oct. 1, 2009.

* cited by examiner

APPARATUS AND METHODS FOR THE GUIDANCE OF FISH

STATEMENT OF GOVERNMENT FUNDING

No government funding was used in connection with this patent application.

STATEMENT OF RELATED APPLICATIONS

This application claims the benefit of U.S. provisional application No. 61/671,067, filed on Jul. 12, 2012, the contents of which are herein incorporated into this application by reference.

BACKGROUND

Field of the Invention

The inventive subject matter is directed towards the broad field of electrical water barriers to stun and repel fish in general and a unique matrix array electrode geometry.

Background

Electricity has been used to stun, capture, or modify the behavior of fish for more than one-hundred years. Various means of developing and controlling electric fields in water have been tried, with varying degrees of success.

The effect of electric currents on fish are well known in the prior art and as described in the prior art of electrofishing. Electrofishing involves the use of electric currents to attract and/or repel fish with the intent of creating aquatic barriers, sample fish populations, and/or to increase collection yields.

It has been established that relatively small potentials impressed across the body of a fish will result in a flight reaction in the fish (e.g. the fish will swim away from the electric field). An increase in the electric potential impressed across the fish results in a physiological response and alignment of the fish with the electric current, or electrotaxis. Still larger potentials may result in unconsciousness or complete euthanasia of the fish.

Electrofishing barriers have traditionally been used in freshwater lakes and streams and are the subject of U.S. Pat. Nos. 5,445,111; 5,327,854; 4,750,451; 4,672,967; 4,713,315; 5,111,379; 5,233,782; 5,270,912; 5,305,711; 5,311,694; 5,327,668; 5,341,764; 5,551,377; and 6,978,734, which are incorporated herein by reference. Also, electrofishing has been used to stimulate yields of fishing in conjunction with the use of trawl nets as described in U.S. Pat. Nos. 3,110,978 and 4,417,301, which are also incorporated herein by reference.

Systems for controlling electricity in aquatic environments have been described in U.S. Pat. No. 5,460,123, which is incorporated herein by reference.

Furthermore, it has been shown that electrical gradient fields can be used to prevent mammalian predators from preying on salmonids. As was described in the paper, "Evaluation of an Electric Gradient to Deter Seal Predation on Salmon Caught in Gill-Net Test Fisheries" (North American Journal of Fisheries ManagementVolume 29, Issue 4, 2009), this paper describing an electric deterrent system was tested as an effective and safe method of deterring predation by Pacific harbor seals *Phoca vitulina richardsi* on sockeye salmon *Oncorhynchus nerka* and pink salmon *Oncorhynchus gorbuscha* caught in a Fraser River gill-net test fishery. These seals were deterred from foraging in a test fishing gill net in the Fraser River by using a pulsed, low-voltage DC electric gradient.

Also there has been further interest in using low voltage gradient fields to simultaneously guide salmonids, but also deter pinnipeds. (See the publication—Influence of a low intensity electric sea lion deterrence system on the migratory behavior of fishes in the upstream migrant tunnel at Bonneville Dam by Matthew G. Mesa, Ph.D. U.S. Geological Survey, submission date Oct. 1, 2009.)

Therefore in the prior art, a considerable body of work is associated with the electrification of large bodies of water to impress electric fields across larger fish, such as salmon or trout. Furthermore, the use of electricity to entrain and/or repel fish is not limited to salmon or trout, but may be used on almost all aquatic species.

Large arrays of vertically oriented electrodes have been used to provide a more or less uniform electric field in the upstream/downstream direction over the entire channel width. Some designs incorporate additional downstream electrodes to produce a weak graduated field for approaching fish. Three phase alternating current designs use the varying voltage and phase relationships between electrodes to provide a rotational vector field, and to help fill gaps in the field produced when the number of electrodes used is limited.

Surface, mid-water, and bottom mounted horizontal electrode arrays have been used to produce fields primarily oriented in the upstream/downstream direction, these fields can readily span the width of the stream. This type of array can provide minimal obstruction to avoid catching debris, and minimal interference with boat traffic (bottom mounted array). Horizontal arrays may be configured to produce a uniform field over a large area or produce a graduated field as required.

Small, movable arrays and electro-fishing boats have been developed to capture fish or move them to more desirable areas by herding.

Some of the common problems with existing electrode arrays (with the possible exception of moveable arrays) are the inability of the array to modify the electric field in order to optimize the field vectors for changing fish approach direction.

The present inventive subject matter proposes an array having a matrix of individually controlled electrodes which can be energized in combinations to produce a field oriented in any direction. The selected field direction would provide the required fish response utilizing the least power. The position of the field can be readily moved to herd fish from one area to the next and only the necessary sections need to be energized, reducing the power required to clear or maintain an area clear of fish.

BRIEF SUMMARY OF THE INVENTION

The present inventive subject matter overcomes problems in the prior art by providing an electrode array composed of multiple independently operated electrodes which would provide enumerable benefits for a fish barrier or fish guidance system.

The apparatus and methods for the guidance of fish include, without limitation, an array barrier for the guidance of fish in a body of water, said barrier having a multiplicity of electrodes arranged in a grid array immersed in a body of water, each electrode capable of having an adjustable electrical potential, an individual electrical potential coupled to each electrode, a control system for the time vary control of the electrical potential, wherein the potential field of the body of water is actively controlled by the modification of the individual potential fields to provide the optimum effect on the fish.

The apparatus and methods for the guidance of fish also includes a barrier for the guidance of fish, said barrier further having the ability to reduce the field in areas where no fish are present; wherein said field reduction could make the barrier friendlier for downstream migrating fish, reduce power consumption, and reduce the interaction with non target species.

The apparatus and methods for the guidance of fish also includes an array barrier for the guidance of fish in a body of water, said barrier further setting the effective size of the electrodes by dynamically adjusting for the optimum field at the surface, or near the bottom of the water by varying the effective size, spacing, applied voltage, polarity, or phase of the applied waveform.

The apparatus and methods for the guidance of fish also includes an array barrier for the guidance of fish in a body of water having sections of the array that can be energized sequentially to provide a moving field to sweep fish from an area.

The apparatus and methods for the guidance of fish also includes an array barrier for the guidance of fish in a body of water having a rotating field to present the optimum field orientation to multiple fish in multiple orientations.

The apparatus and methods for the guidance of fish also includes an array barrier for the guidance of fish in a body of water having a matrix array to accommodate funnel entrances, or specialized channels may be created to guide fish into traps or away from obstacles.

The apparatus and methods for the guidance of fish also includes an array barrier for the guidance of fish in a body of water that adjusts parts of the array to increase or reduce the electric field as needed to compensate for barge traffic or other local disturbances without adversely affecting the remainder of the fish barrier; such that the adjustment of the local field eliminates the possibility of local overloading.

The array barrier for the guidance of fish in a body of water also allows for the developing and testing the minimum possible array which could be deployed and still be effective under similar circumstances of fish approach and water velocities. For array testing the matrix provides access to virtually any array configuration without requiring the removal of one array and replacement with a different configuration. This capability would save much time and effort when testing various arrays to optimize the guidance or blocking characteristics of a fish barrier and or guidance array.

These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

DESCRIPTION OF THE DRAWINGS

An electrode array composed of multiple independently operated electrodes would provide enumerable benefits for a fish barrier or fish guidance system including.

DETAILED DESCRIPTION

Figure 1:
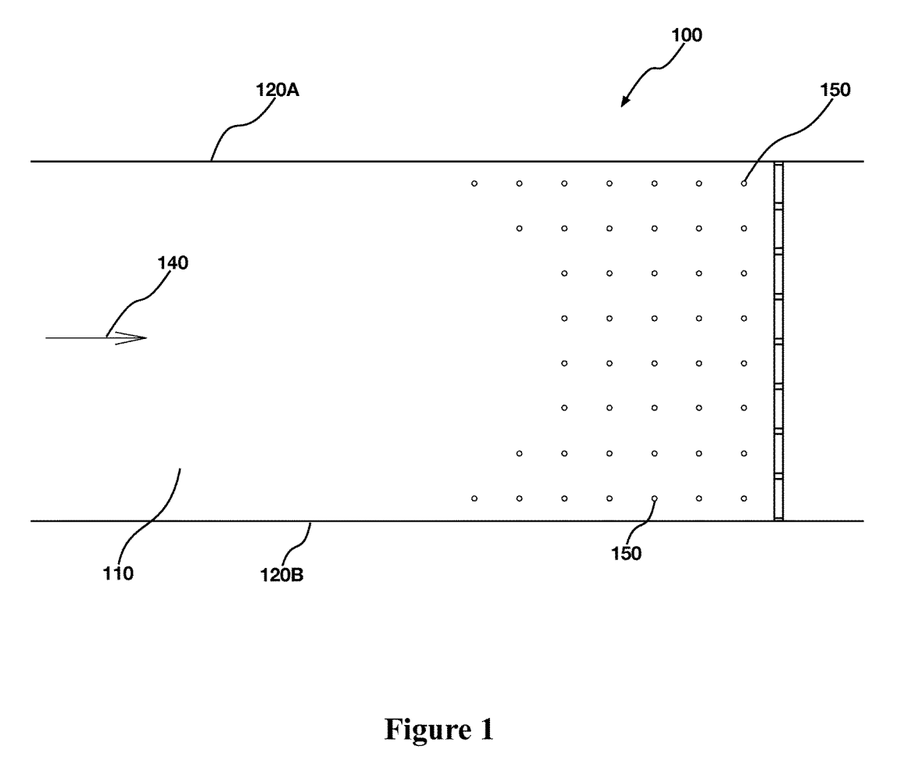
FIG. 1 is a top view of the matrix array electrical barrier with a set of varying potentials.
Figure 2:
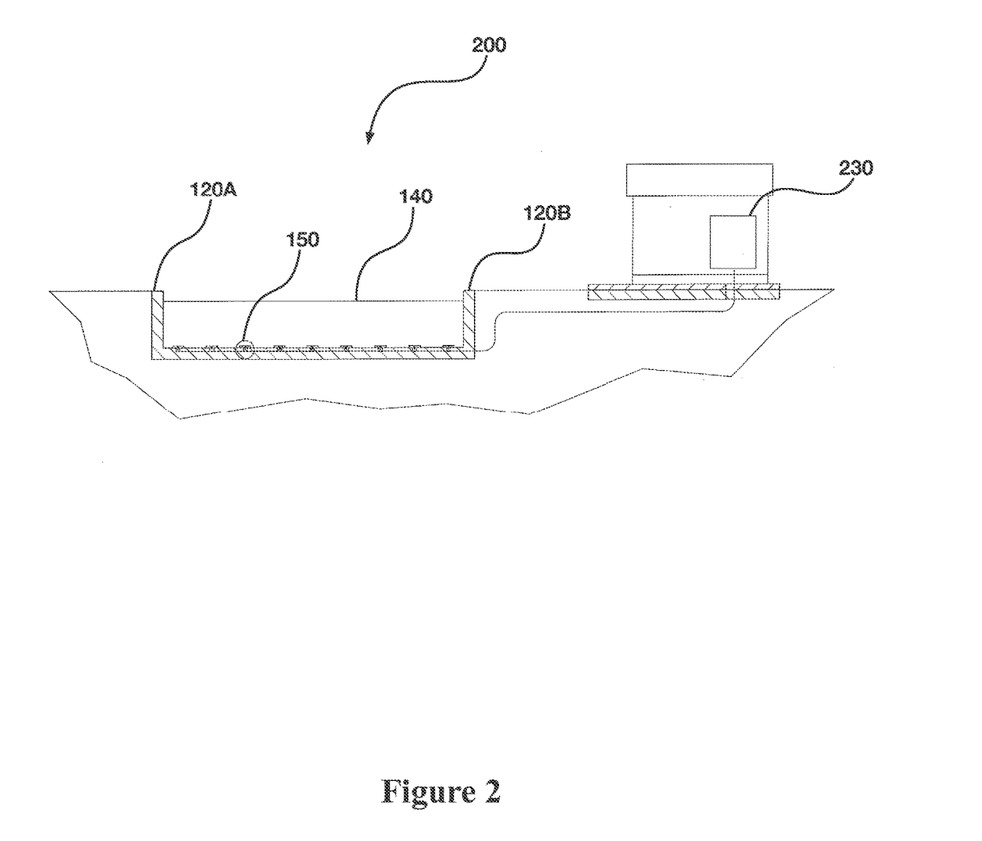
FIG. 2 is a cut-away (side), and detailed view of the matrix array electrical barrier.
Figure 3:
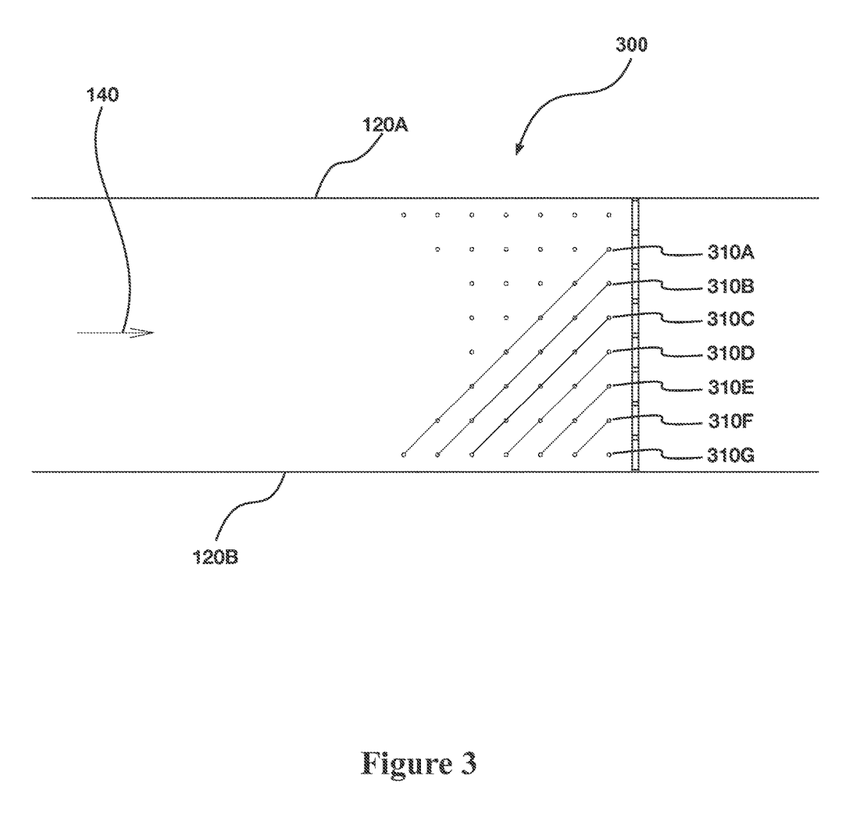
FIG. 3 is another top view of the matrix array electrical barrier illustrating one embodiment of the interconnected electrodes.

Representative embodiments according to the inventive subject matter are shown in FIGS. 1-3, wherein similar features share common reference numerals.

Now referring to FIG. 1 which depicts a top view of the electrode array installation 100. The electrode array installation 100 is placed in water channel 110 that is constrained by outer banks 120A, 120B. There is a flow 140 of water where the water 120 flows over individual electrodes 150 that are mounted on the bottom of the water channel 110.

In one embodiment, the water channel has dimensions of approximately 17 ½" in width and the electrodes 150 are spaced approximately 30 inches apart.

Now referring to FIG. 1 which depicts a top, cut-away (side), and detailed view of the matrix array electrical barrier. The top, cut-away (side), and close-up views of the barrier depicts a matrix array of electrodes embedded in an insulating concrete support structure. The electrode, in one embodiment, has a replaceable electrode plate that is mechanically connected to an embedded electrode. The replaceable electrode plate and the embedded electrode are mechanically and electrically joined using an electrically conductive bolt. The electrical conductivity between the surfaces is enhanced by a conductive potting compound. This structure also provides for the ease of replacing the electrode plate if the plate becomes corroded over time due to electrolytic action or is damaged by impact with an object in the water.

Each electrode is connected to control system that can individually set the potential of each electrode. Those skilled in the art will recognize that if two electrodes are at varying potentials, the voltage gradients will affect the behaviour of an aquatic species. How a particular species is affected is dependent on the type of species, the length of the fish, and the individual physiology of the fish.

FIG. 2 is a side view of the matrix array electrical barrier 200 with a set of varying potentials. The voltage gradient being dependent on the conductivity of the water and the location of the electrodes and being controlled by the control system 230.

FIG. 3 is a top view of the matrix array electrical barrier 300 with one set of electrodes at 8.5 v. This creates an electric potential "wall" by imposing a voltage gradient that is dependent on the conductivity of the water and the location of the electrodes. In this particular embodiment the electrical potentials have been set at an increasing amount from 0 to 4.2 v to 12.70 v to 25.4 v to 63.6 v to 89.0 v. The voltage gradient is schematically represented by 310A-G. In this particular embodiment, the electrodes create a field that varies from 0 to ½ v/in.

The examples described are not limited to DC voltages. The individual array electrodes can be energized with AC waveforms and/or pulsed DC waveforms. The voltage gradients can be produced by a variety of devices in the Smith-Root line of pulsators, including, but not limited to.

Figure 4:
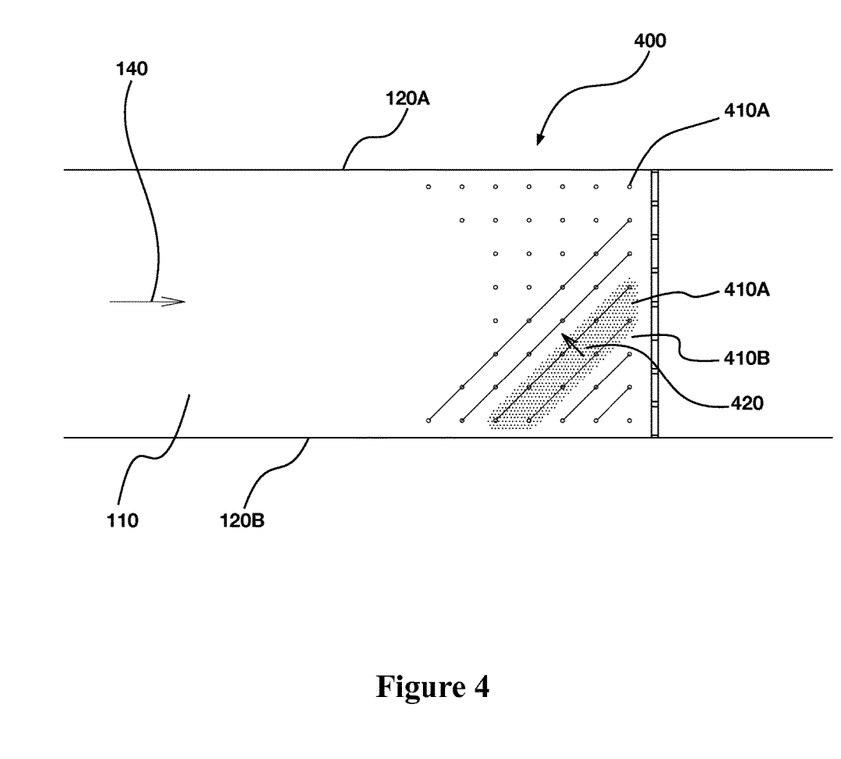
FIG. 4 is a top view depicting the movement of the electrical field from the bottom right hand corner of the electric field barrier to the top left hand corner.

1) The LR-20B and LR-24 backpack electrofishers used as individual pulsators;
2) The GPP Electrofisher pulsator
3) The WP-15B Electrofisher pulsator
4) Type VI-A Electrofisher pulsator
5) Type 1.5 KvA Electrofisher pulsator Now referring to FIG. 4 which depicts a top view of the movement 420 of the electrical field from the bottom right hand corner of the electric field barrier to the top left hand corner. In this embodiment each electrode is set with a spatially varying and time varying electrical potential that "sweeps" an aquatic species from one physical location in the water channel 110. This sweeping feature can be set by setting the potential difference of the electrodes line 410b at a value higher than the electrode line 410a. If the electric potential for the electrodes is at a value that is repulsive to one aquatic species but a strong deterrent to another, then there would be filtering effect along certain potential gradient isopotentials.

Figure 5:
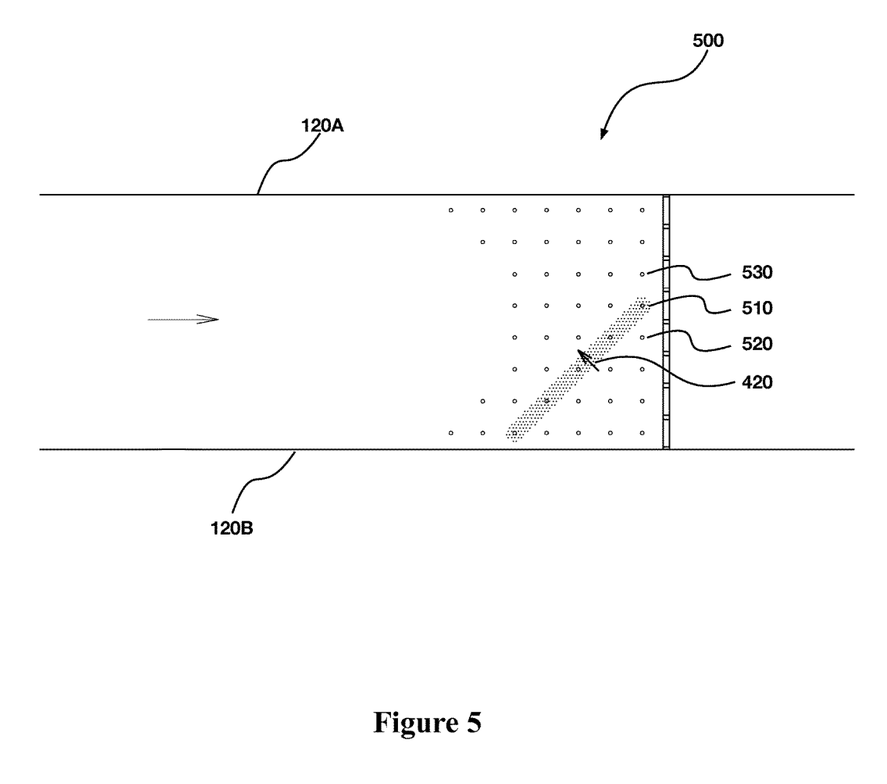
FIG. 5 is a top view depicting the movement of an alternating current electrical field that progresses from the bottom right hand corner of the electric field barrier to the top left hand corner.

FIG. 5 is a top view depicting the movement of an alternating current electrical field that progresses from the bottom right hand corner of the electric field barrier to the top left hand corner. The electric field movement 420 would move along the gradient isopotential field lines to "herd" the aquatic species from one corner to another.

Figure 6:
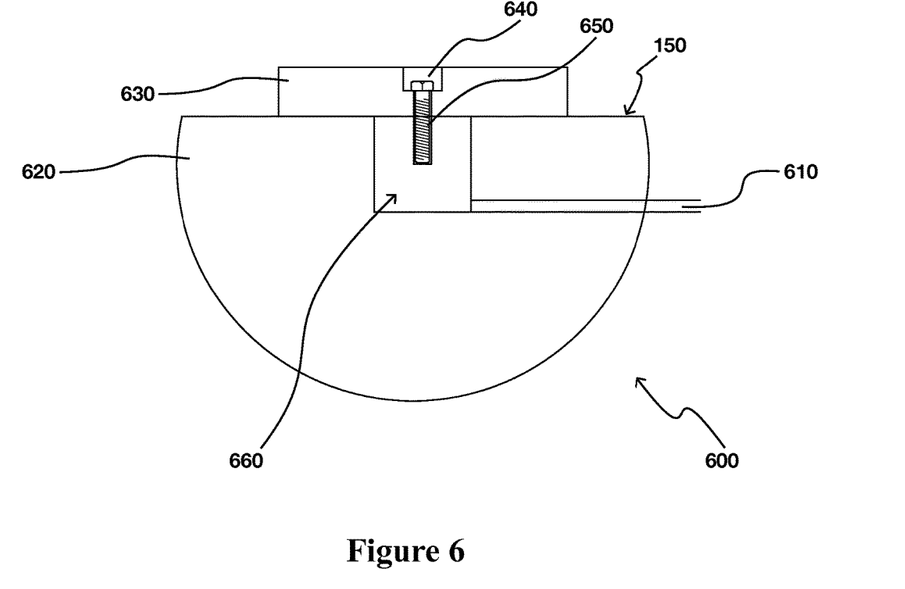
FIG. 6 is a profile cut-away view of the electrode and its placement in the insulcrete weir.

FIG. 6 is a profile cut-away view 600 of a single electrode 150 and its placement in the insulating concrete weir 620. The single electrode 150 has a conductive electrode top 630, an attachment screw 650 which is covered by a potting compound 640. The attachment screw 650 is connected to base conductor 660 that is further connected to an electrode 610.

Figure 7:
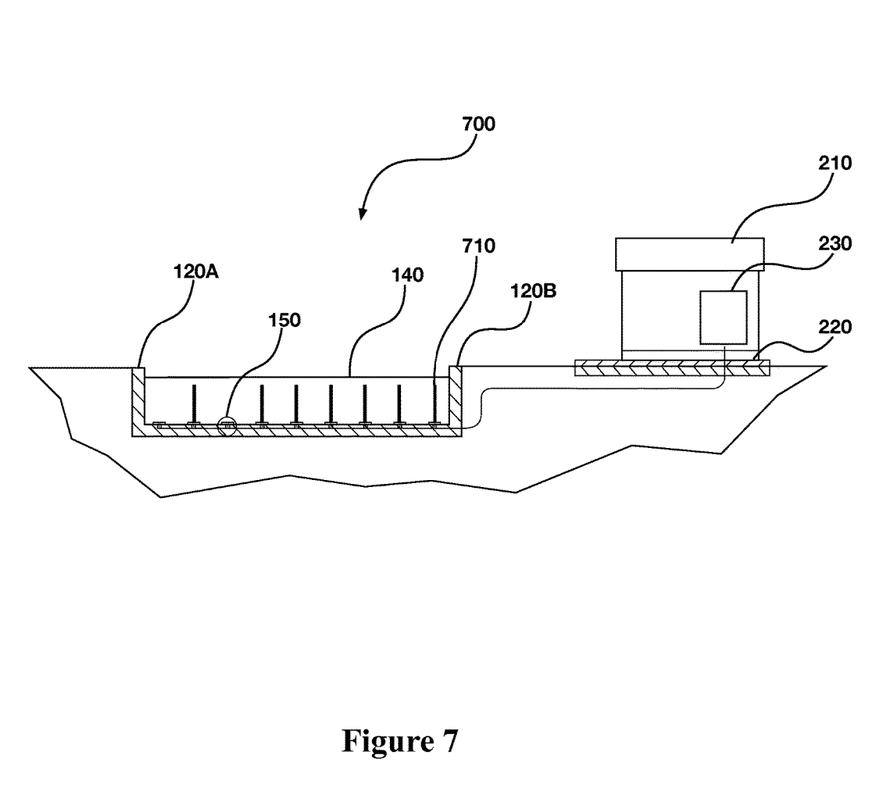
FIG. 7 illustrates the electrode array mounted on extendable rods, where the rods extend from the floor of the water channel.

Now referring to FIG. 7 which illustrates 700 the electrodes 150 placed in an array, where the conductive portion of the electrode is placed on an extendable and upward projecting rod 710. These rods may further be flexible so that if they are hit by floating objects in the water (e.g. boat hulls). They do not break off or damage the hull of the boat.

The use of a particular pulsator in a particular stream will determine the voltage gradients generated in the body of water.

The field generation system can be enhanced by using monitoring systems, such as camera and/or fish counters to direct the local electric field vectors to provide the optimum effect on the fish. These monitoring systems can also reduce the amount of power (and corresponding electrical cost in areas where no fish are present. This embodiment will reduce the effect of the barrier on downstream migratory fish, reduce power consumption, and reduce the interaction with non target species.

The physical positioning of the electrodes does not require that the electrodes be set in a fixed grid array. The physical size of the electrodes may be dynamically adjusted for the optimum field at the surface, or near the bottom of the water by varying the effective size, spacing, applied voltage, polarity, or phase of the applied waveform.

Further, entire sections of the array can be energized sequentially to provide a moving field to sweep fish from an area. Furthermore, the electric field may be dynamically rotated, to create an optimum field orientation to multiple fish in multiple orientations.

Also, the array may be configured to funnel the entrances, or specialized channels may be created to guide fish into traps or away from obstacles.

Parts of the array may be adjusted (electric field increased or reduced) as needed to compensate for barge traffic, or other local disturbances without adversely affecting the remainder of the fish barrier. This adjustment of the local field could virtually eliminate the possibility of local overloading necessitating a reduction of the field in other areas of the fish barrier (each array element would be current limited and or individually adjusted for peak voltage and conduction period).

The matrix array could provide a reliable basis for development of the minimum possible array which could be deployed and still be effective under similar circumstances of fish approach and water velocities. For array testing, the matrix provides access to virtually any array configuration without requiring the removal of one array and replacement with a different configuration. This capability would save much time and effort when testing various arrays to optimize the guidance or blocking characteristics of a fish barrier and or guidance array.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

We claim:

1. An array barrier for the guidance of fish in a body of water, said barrier comprising:
a multiplicity of electrodes wherein each of the electrodes are 30 inches apart from each other in a grid array immersed in the body of water,
each of the electrodes comprising;
an embedded electrode, the embedded electrode embedded in an insulating concrete support structure;
a conductive electrode top;
the conductive electrode top mechanically and electrically connected to the embedded electrode via an electrically conductive bolt covered by a conductive potting compound; further
each of the electrodes capable of having an adjustable electrical potential and generating an adjustable potential field ranging between 0.0 v to 89.0 v;
a control system for the time vary control of the electrical potential;
wherein the potential field of the body of water is varied from 0.0 to 1.2 v/inches and is actively controlled by sequentially adjusting the potential fields to create an electrical sweep to herd the fish in specialized channels.

2. The array barrier for the guidance of fish in a body of water as described in claim 1 further comprising of monitoring cameras to help direct the electric field to provide optimum effect on the fish.

3. The array barrier for the guidance of fish in a body of water as described in claim 1 wherein the specialized channels can be used to build fish traps.

4. The array barrier for the guidance of fish in a body of water as described in claim 1 wherein the electric field can be adjusted to compensate for barge traffic.

5. The array barrier for the guidance of fish in a body of water as described in claim 1 wherein the electric field can be adjusted to create funnel entrances.

6. The array barrier for the guidance of fish in a body of water as described in claim 1 wherein the electric field is in the form of rotating electric field to present the optimum field orientation to multiple fish in multiple orientations.

7. The array barrier for the guidance of fish in a body of water as described in claim 1 wherein the array barrier can be used for array testing to emerge with an optimum array for a given configuration.

8. The array barrier for the guidance of fish in a body of water as described in claim 1 wherein the array barrier can be used for creating an electric potential wall.

9. The array barrier for the guidance of fish in a body of water as described in claim 1 wherein the array barrier is energized using AC wave forms.

10. The array barrier for the guidance of fish in a body of water as described in claim 1 wherein the array barrier is energized using pulsed DC wave forms.

11. The array barrier for the guidance of fish in a body of water as described in claim 1 wherein the electrodes are placed on extendable and flexible upward projecting rods.

12. The array barrier for the guidance of fish in a body of water as described in claim 1 wherein the electrical potential of the electrode can be dynamically adjusted for an optimum field at the surface of the body of water.

13. The array barrier for the guidance of fish in a body of water as described in claim 1 wherein the electrical potential of the electrode can be dynamically adjusted for an optimum field at the bottom of the body of water.

* * * * *